United States Patent [19]

de Sousa

[11] 4,322,191
[45] Mar. 30, 1982

[54] DIE FINISH-CUTTING MACHINE

[76] Inventor: Manuel E. X. de Sousa, 765 N. Montello St., Brockton, Mass. 02401

[21] Appl. No.: 110,491

[22] Filed: Jan. 8, 1980

[51] Int. Cl.³ ............................................... B23C 1/16
[52] U.S. Cl. ..................................... 409/292; 409/97; 409/104; 409/289
[58] Field of Search .................... 409/93, 97, 104, 107, 409/109, 110, 111, 112, 113, 122, 123, 125, 289, 291, 292; 144/145; 51/127

[56] References Cited

U.S. PATENT DOCUMENTS

| | | | |
|---|---|---|---|
| 918,889 | 4/1909 | Morgan | 409/289 |
| 1,607,895 | 11/1926 | Karr | 409/93 |
| 2,182,331 | 12/1939 | Atkins | 409/104 |
| 2,902,905 | 9/1959 | Meyer | 409/289 |
| 2,997,926 | 8/1961 | Veryser | 409/289 |
| 3,434,386 | 3/1969 | Hobbs | 409/289 |
| 3,618,464 | 11/1971 | Michaud | 409/97 X |
| 3,838,623 | 10/1974 | Schell | 409/104 |
| 3,861,275 | 1/1975 | Mueller | 409/97 X |

Primary Examiner—William R. Briggs
Attorney, Agent, or Firm—James H. Grover

[57] ABSTRACT

Apparatus for making the finishing cut on the internal outline of a rough cut female die has two carriages one sliding in one direction upon the other, and the other carriage sliding upon a base at right angles to the first. A male punch comprising a template of the outline to which the die is to be finish cut is mounted on one carriage and the die or workpiece is mounted in an indexing work holder on the other carriage. The template engages a tracer finger fixed relative to the base and to a hacksaw blade which finish cuts the die or workpiece by strokes with the plane of the blade perpendicular to the die surface being cut. The tracer and blade are in common planes to which one carriage moves perpendicularly and the other parallel. The cutter blade and tracer respectively engage the die or workpiece and punch or template in the same direction so that cutting action urges the template and tracer into engagement. Preferably the tracer is supported on a hinged mount which can swing the template 180 degrees into opposition to the workpiece, so that the die or workpiece can be adjusted in its work holder until registered with the punch or template. A linear drive for one of the carriages is used for moving the workpiece carriage for cutting along linear portions of the die/workpiece, a linear portion of the template simultaneously moving along the tracer so as to urge the template and both carriages in a second direction normal to the first to the extent that the template deviates from linearity.

For cutting arcuate workpiece surfaces the template and workpiece are rotatably mounted on their respective carriages and turned by a rotary drive. An adjustable eccentric coupled between the rotary drive and workpiece carriage translates the workpiece carriage during rotation to compensate for the displacement of the workpiece rotational axis from the axis of curvature of the arcuate surface being cut.

27 Claims, 17 Drawing Figures

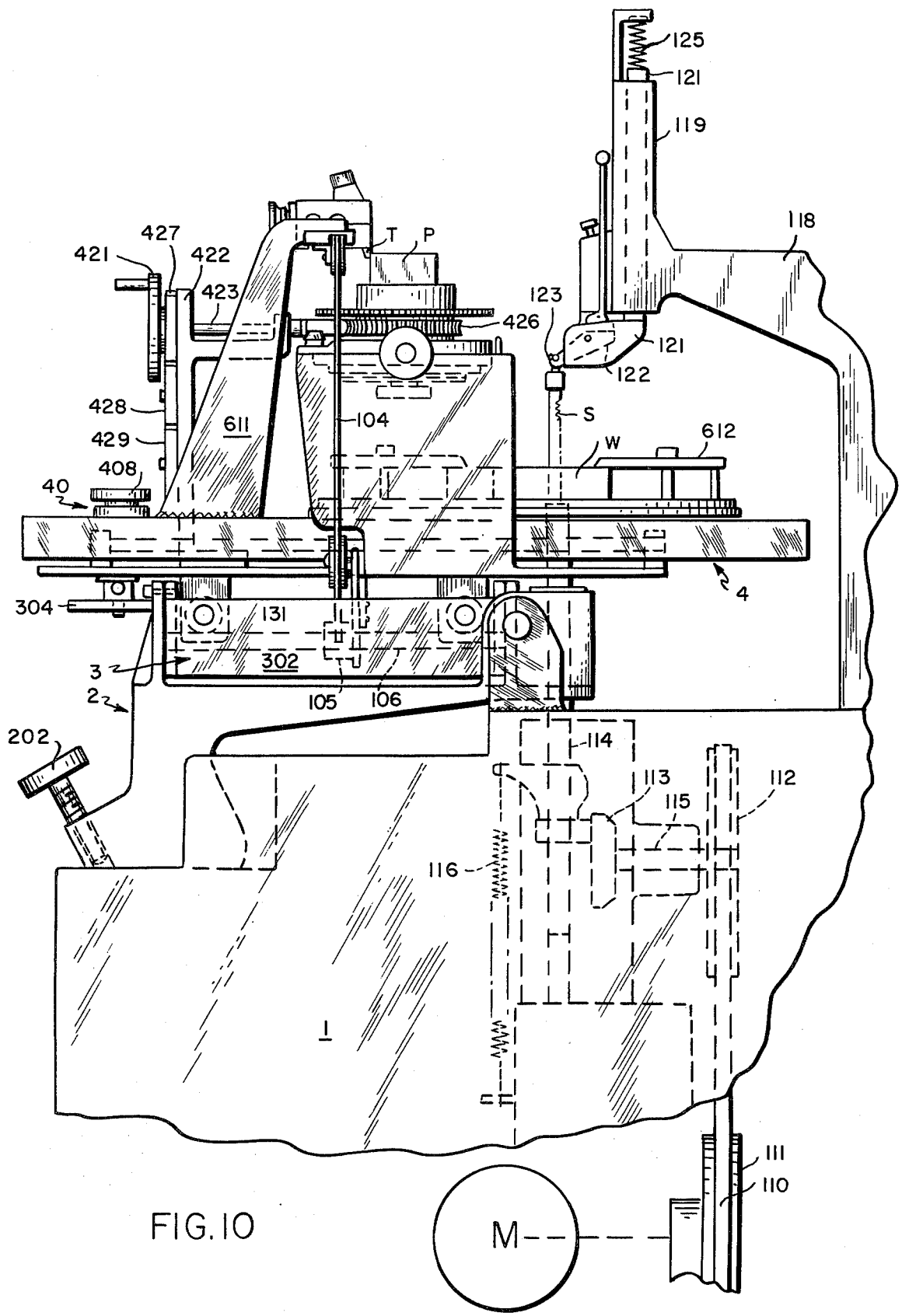

DIE FINISH-CUTTING MACHINE

BACKGROUND OF THE INVENTION

This invention relates to female dies used with male punches, particular dies which have an opening through them which has an internal outline exactly matching the external outline of the punch and receiving the punch to cut out a piece of metal or other sheet material with the outline of the punch and die. Before the opening through the female die precisely matches the punch the die opening is rough cut to an outline smaller than that of the punch. Hitherto the die opening has then been hand filed from its rough form to the outline exactly matching the punch.

The need exists for cutting the outline of the punch or other template on a die or similar workpiece by automatic or semi-automatic machinery wherein the punch or template follower and die cutter cooperate to maintain engagement between the follower and punch or template and between the cutter and the die.

One object of the present invention is to provide a machine in which the template follower and die cutter do cooperate to maintain such engagement. A further object is to provide a die finish-cutting machine which uses the corresponding punch to locate the rough-cut die in the machine. Another object is to provide a machine which will cut arcuate surfaces on the die off the center of rotation of the die on its work table.

SUMMARY OF INVENTION

According to the invention apparatus for cutting a predetermined outline on a workpiece comprises a base, a workpiece carriage and a template carriage movably mounted one upon the other and the other upon the base, a cutter on the base, a workpiece holder on the workpiece carriage holding the workpiece for movement with the workpiece carriage relative to the cutter, a template on the other carriage having the predetermined outline, and a tracer on the workpiece carriage for following the template outline, the cutter and tracer respectively engaging workpiece and template in the same direction so that reaction of the workpiece to cutting action urges the template and tracer into engagement.

Further according to the invention the apparatus includes a template holder rotatably mounted on the template carriage, the workpiece holder securing the workpiece for rotation about a first axis, a rotary drive coupling the template holder and workpiece holder for coordinated rotation of the template and workpiece while cutting an arcuate outline around a second axis, and an eccentric coupled to said drive for moving the workpiece carriage to hold the second axis in line with the cutter.

Still further according to the invention the template and workpiece carriages hold the template and workpiece at different levels, the template carriage including a template holder pivotted on the template carriage so that the template may be swung from the tracer to the level of the workpiece for axial alignment therewith.

DRAWINGS

Figure 2:
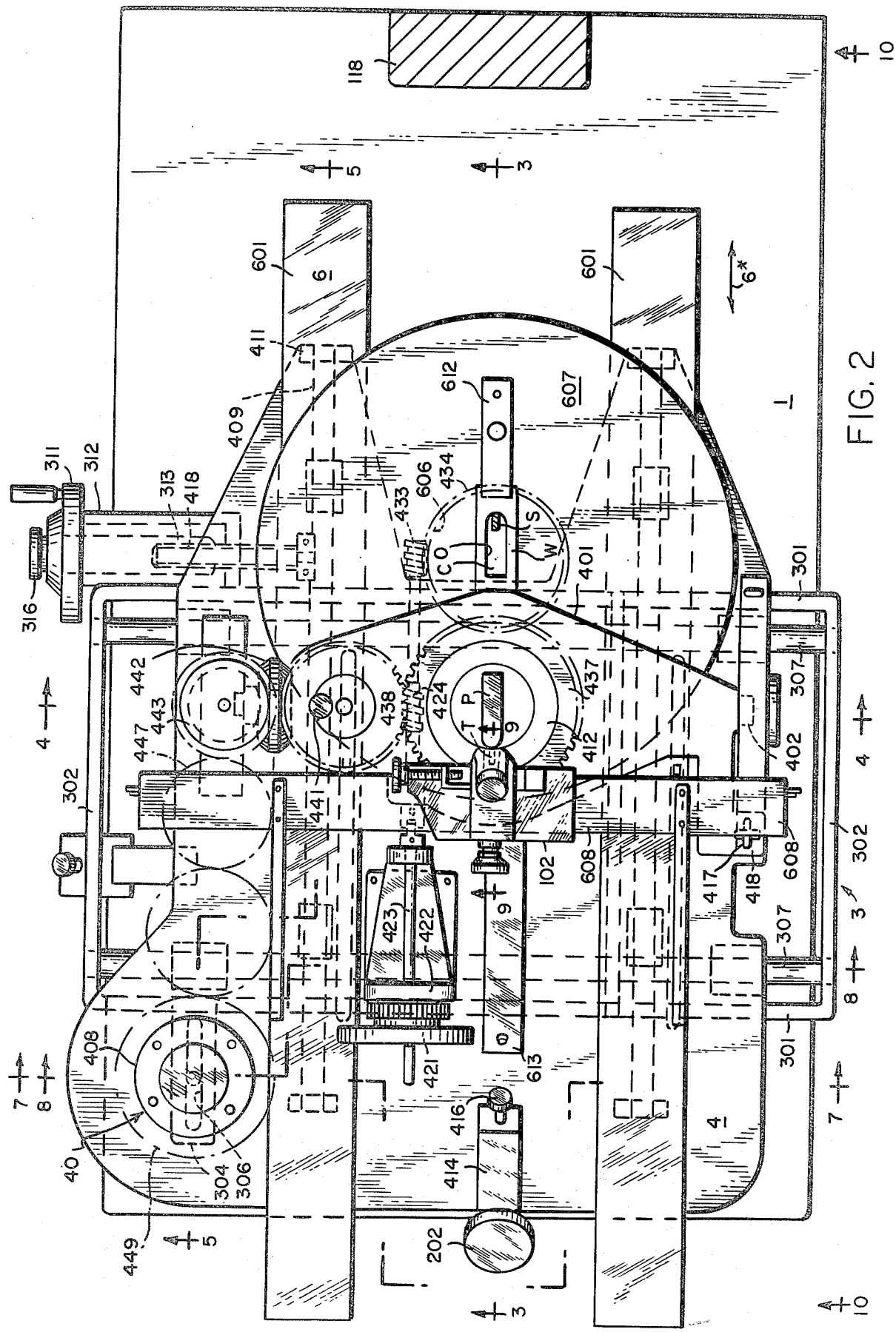
FIG. 2 is a plan view of the complete apparatus.
Figure 5:
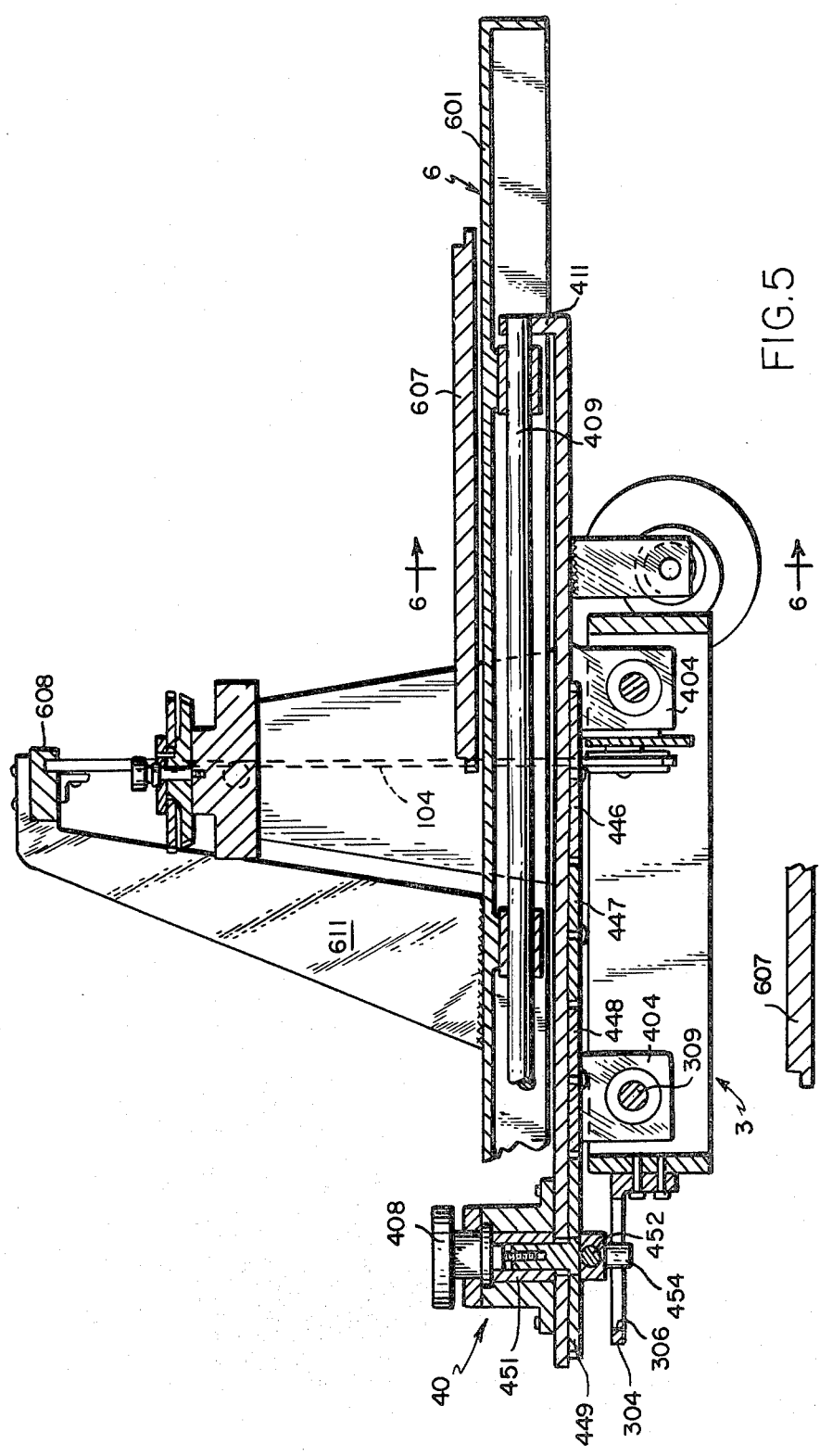
Figure 7:
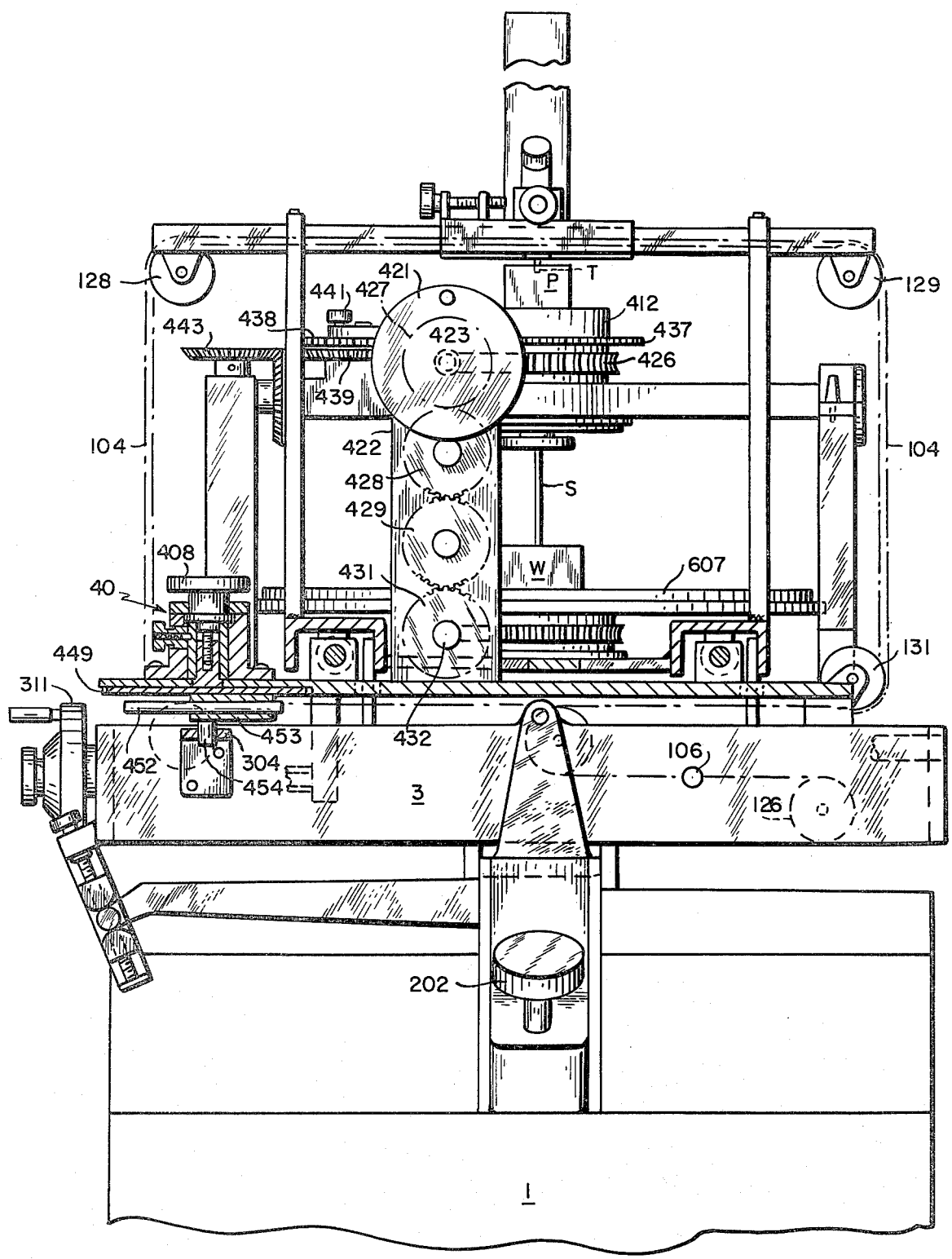
Figure 9:
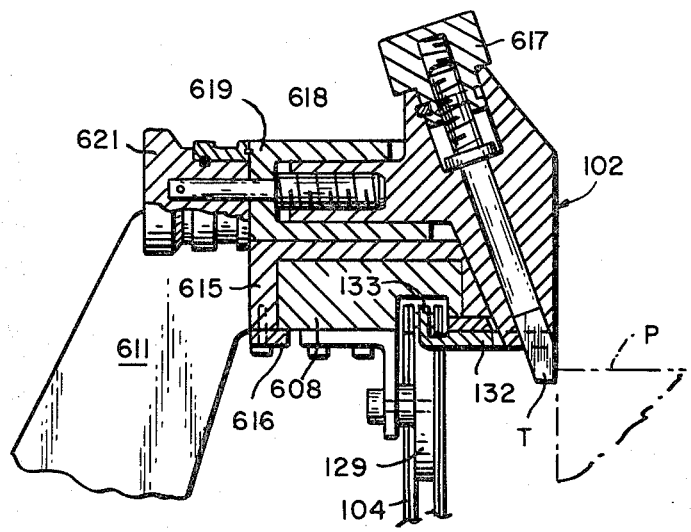
Figure 8:
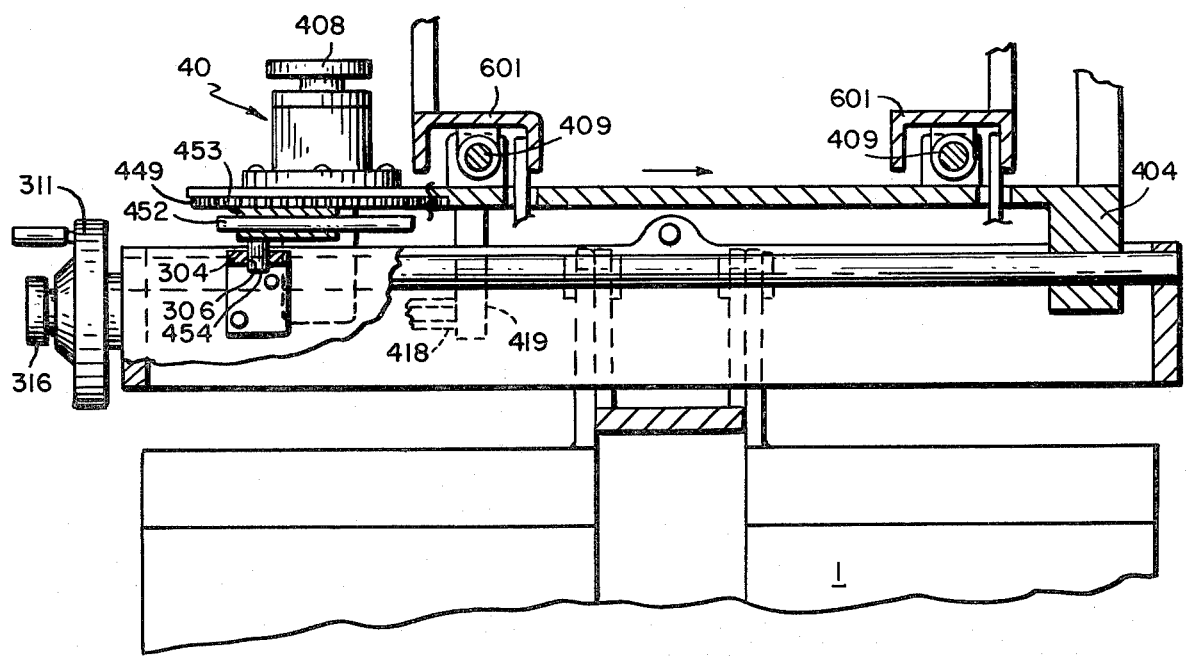
Figure 12:
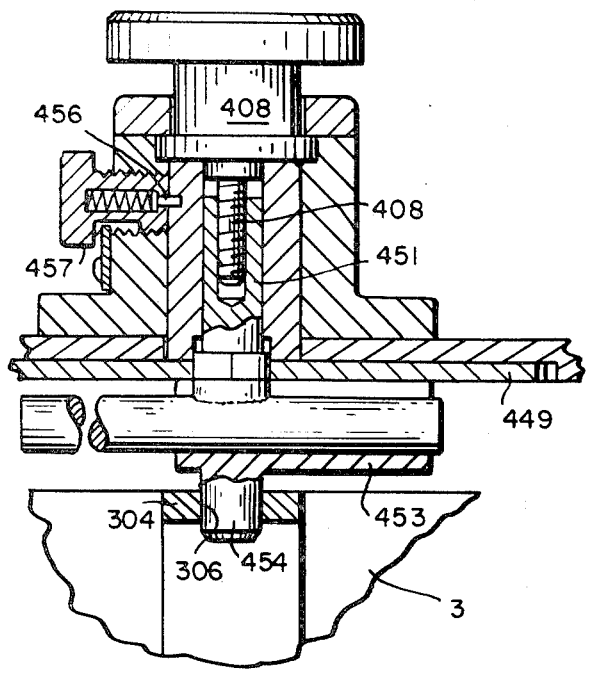
Figure 11:
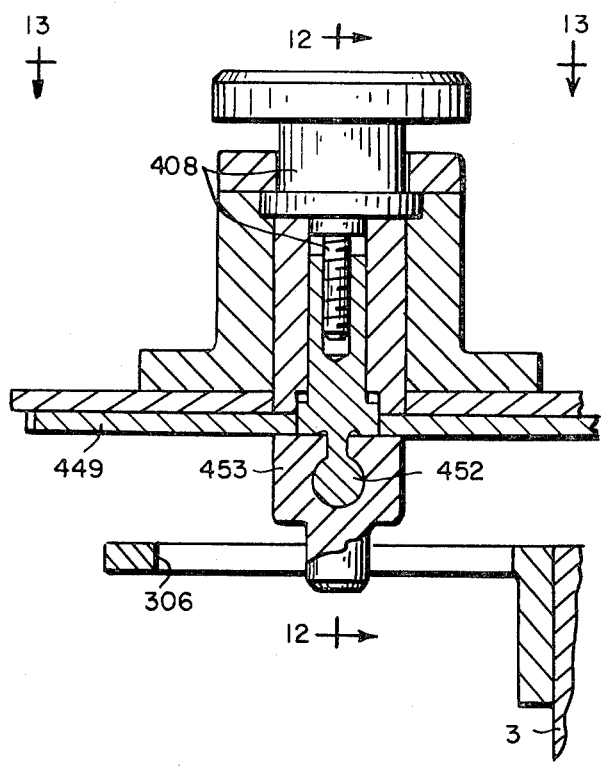
Figure 13:
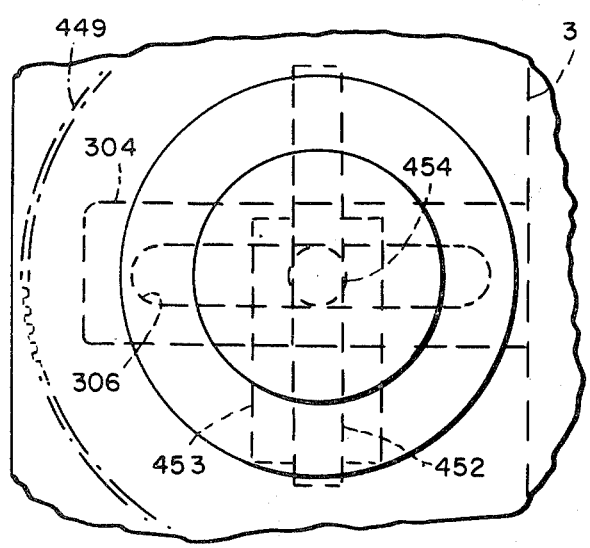
Figure 14:
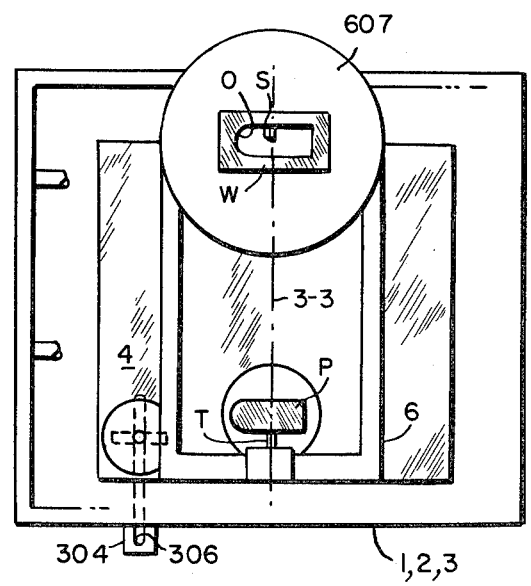

FIGS. 7 and 8 are sections on lines 7—7 and 8—8 of FIG. 2;

FIG. 9 is a section on line 9—9 of FIG. 2;

FIG. 10 is an elevation viewed from plane 10—10 of FIG. 2;

FIG. 11 is an enlarged section of a portion of FIG. 5;

FIG. 12 is a section on line 12—12 of FIG. 11;

FIG. 13 is a plan view from plane 13—13 of FIG. 11; and

FIGS. 14 to 17 are diagrammatic plan views showing operation of the apparatus.

DESCRIPTION

Figure 3:
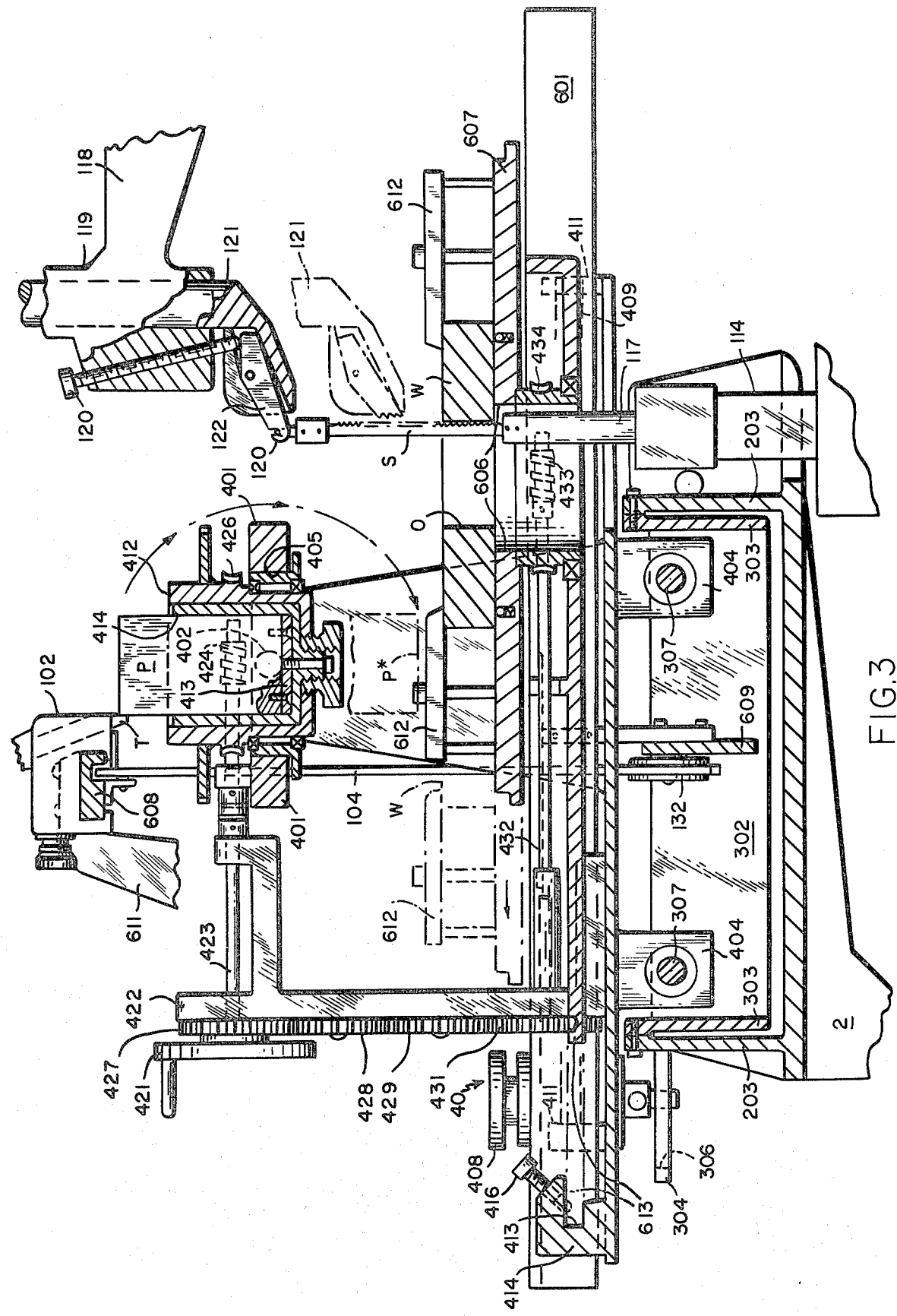
FIGS. 3 to 5 are sections on lines 3—3 to 5—5 of FIG. 2.
Figure 4:
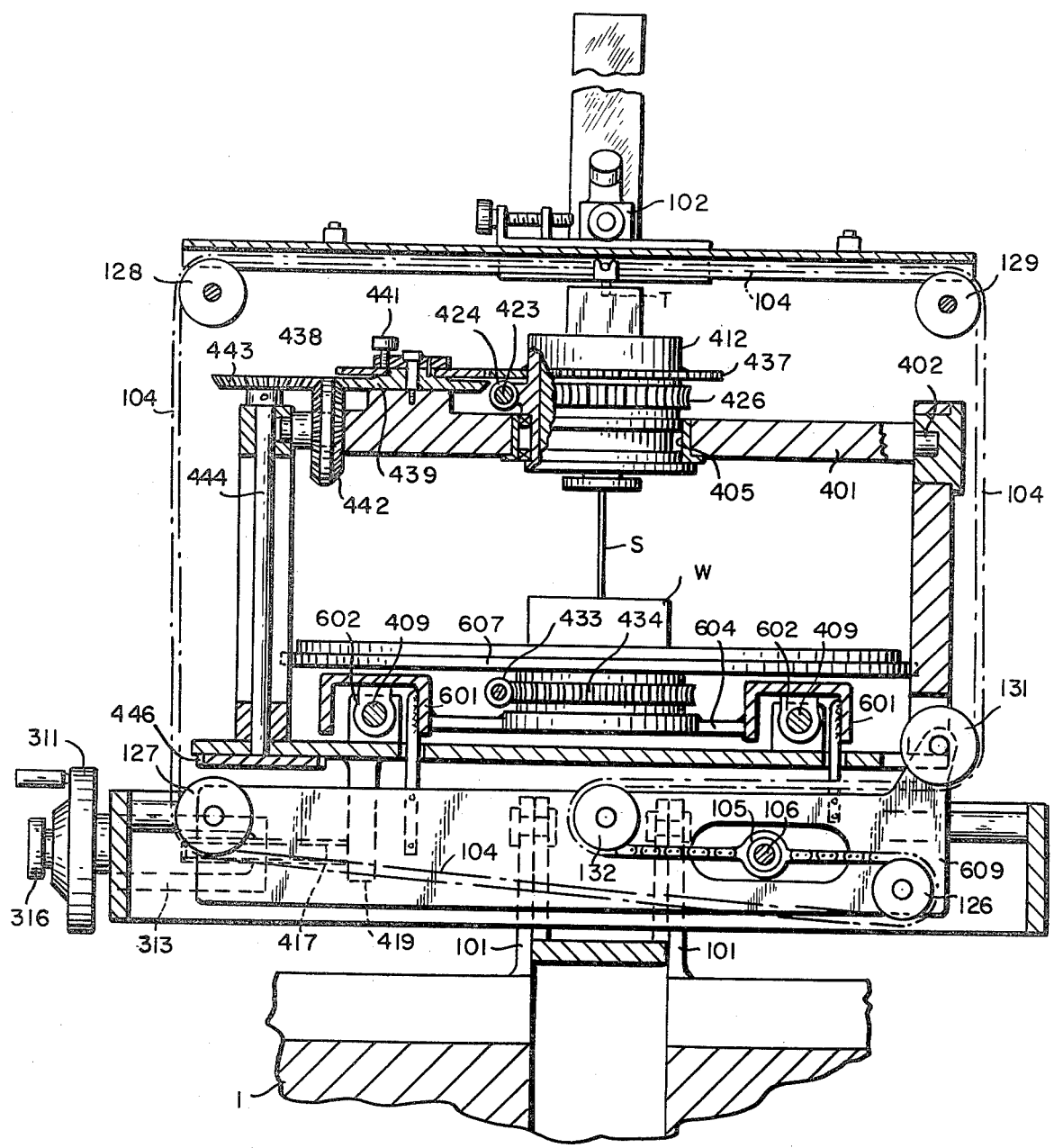

I—General Description—FIGS. 1 to 10
II—Positioning the Punch and Die—FIGS. 2 to 4
III—Cutter Blade—FIGS. 3 and 10
IV—Template and Tracer—FIGS. 2 to 4, 9 and 10
V—Cutting Straight Die Faces—FIGS. 2 to 4, 6, 7 and 10
VI—Cutting Arcuate Die Faces—FIGS. 2 to 6, 7, 8 and 11 to 17

I—GENERAL DESCRIPTION

In the illustrated example of the present invention the object is to make a finishing cut in the opening O of a female die workpiece W as shown in FIG. 2. It is customary to rough-cut the die opening to the interior outline O and then hand file the interior opening until it exactly matches the exterior outline of a male punch P shown to the left of the die W in FIG. 2. According to one aspect of the present invention the punch P is used as a template for finish-cutting the die or workpiece W. The relation between the punch/template P and die/workpiece W is also shown clearly in FIGS. 14 to 16.

Finish-cutting of the interior die opening O is done with a reciprocating saw blade S under the control of a tracer T which follows the exterior outline of the punch/template P. The present apparatus turns the die/workpiece W so that the saw blade S is always at right angles or normal to the interior face of the workpiece opening O. The saw blade strokes downwardly through the opening against the face then backing inwardly from the die face on the upward stroke, and by such strokes, rapidly repeated as the die/workpiece W is moved relatively to the blade under the control of the tracer T, cuts a smooth finish on the interior of the die exactly matching the exterior outline of the punch/template P.

Figure 1:
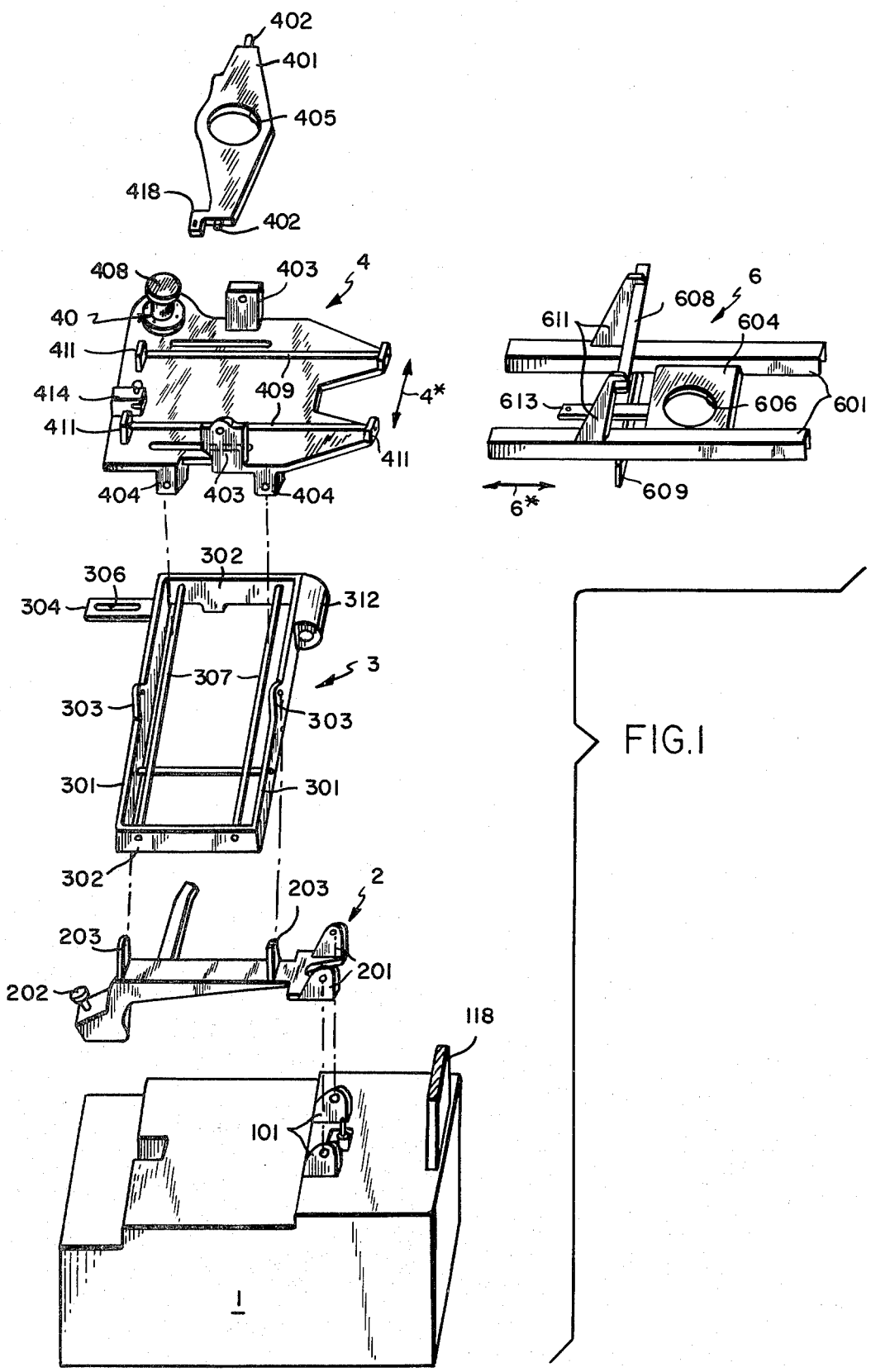
FIG. 1 is an exploded isometric view of the major elements of apparatus for finish cutting a die, parts being omitted.

FIG. 1 does not show the above described operating elements but does show the supports for those elements. The supports are a base 1 with pivots 101 for a tilting arm 2 with pivot plates 201 fitting between the base pivots 101 through all of which a pivot pin passes. A screw 202 angularly adjusts the pivot arm relatively to the base. The tilting arm 2 has secondary pivot plates 203 pivotally pinned to pivot ears 303 found in the sidewalls 301 of a base frame 3. The base frame 3 has a tab 304 with a linear slot 306 adapted to receive an eccentric pin as described under the caption.

VI—CUTTING ARCUATE DIE FACES

The frame 3 also has two guide rods 307 slidingly supporting a template carriage 4. The base 1, tilting arm 2 and base frame 3 are relatively adjustable but are motionless during die cutting operation.

The template carriage 4 supports the punch/template P which, although not shown in FIG. 1, is carried on a bridge 401 with an aperture 405 having pivot pins 402 fitting in pivot plates 403. Below the template carriage are lugs 404 bored to fit on the guide rods 307 of the base frame below so that the template frame slides in a first direction 4* transversely of the base 1. The template carriage 4 also mounts a manual screw 408 for clamping the eccentric pin described under caption VI. Upper guide rods 409 extend between tabs 411.

Above the template carriage 4 is a workpiece carriage 6 having inverted channels 601 fitting over the tabs 411 of the template carriage. Inside the channels 601 are welded short tubes 602 sliding on the template upper guide rods 409 as best shown in FIG. 4. This sliding movement shown by the double headed arrow 6* is in a direction at right angles to the motion 4* of the template carriage. A plate 604 with an opening 606 for the saw S is the base for a rotating workpiece holder 607 shown in FIGS. 2 and 3. Standards 611 above the channels 601 support a cross bar 608 for a cursor 102 which supports the tracer T following the outline of the punch/template P. A plate 609 below the workpiece carriage mounts rollers for a sprocket chain 104 connected between the cursor and an anchor 106 on the base frame.

II—POSITIONING THE PUNCH AND DIE—FIGS. 2 TO 4

The punch, whose exterior outline serves as a template for finish-cutting the die, is secured in a collar 412 which is rotatively journalled in the aperture 405 of the bridge 401 which in turn is pivotted by pins 402 on the template carriage 4. A base plate 413 is attached by screws threaded into the punch/template P. The base plate 413 in turn is secured by a screw to a collar lining 414 fitting the punch P. Because of the adjustability of the workpiece the punch/template need not be precisely positioned in the collar 412 so long as the upper face of the punch is normal to the axis of the collar and is free to be followed by the tracer.

The die/workpiece W with its rough-cut opening O is loosely positioned by clamps 612 on the rotating work holder 607 with the opening O over the opening 606 for the saw S which is temporarily removed. Normally the work carriage 6 is positioned by the engagement of the saw S with the workpiece W as opposed by engagement of the tracer T with the punch/template P. When released the work carriage slides on the rods 409 to the phantom position W* shown in FIG. 3 in which a tongue 613 under the carriage is received in the slot 413 of a boss 414 and secured by a set screw 416. The template bridge 401 is then released to swing on its pivot pins 402 by unfastening a latch 417 extending through a slot in a lug 418 adjacent one pivot 402 of the template bridge (FIGS. 1 and 2). The bridge and punch/template are then free to swing 180° to a position where the punch is at the level of the workpiece and over the opening O in the workpiece W.

Prior to mounting in the cutting apparatus the punch has been used to indent a precise outline on the face of the die. Thereafter a smaller opening inside the precisely indented outline has been rough-cut so that the precise outline indentation remains. The workpiece is now adjusted on its workholder until its indented outline is precisely aligned with the outline of the punch/template and secured by clamps 612. The workpiece carriage tongue 613 is then released from its engagement in the slot 413 and, when released, the workpiece carriage slides on the rods 409 to the position shown in solid lines in FIG. 3. Then the template bridge 401 is swung back to its solid line position in FIGS. 2 and 3 and secured by the latch 417 in engagement with the tracer T.

III—CUTTER BLADE—FIGS. 3 AND 10

The saw cutter blade S is vertically reciprocated by a motor M on the base 1 linked by a belt 110 between pulleys 111 and 112. The upper pulley 112, through an axle 115, drives an accentric 113 which reciprocates a saw plunger 114 under the constraint of a spring 116, the upper end of the plunger being connected axially to a lower saw blade clamp 117. A standard 118 arising from the base 1 extends to a head 119 in which an upper plunger 121 reciprocates. The plunger 121 is suspended from a spring 125 and carries a pivotted lever 122 with a hook 123 which supports the upper end of the saw S. In its solid line position in FIG. 3 the lever 122 holds the saw vertical on its down stroke. The cutting edges of the saw teeth are then parallel to the interior outline of the die opening O and thus chisel or scrape a flat face, under the control of the punch template, from the rough-cut opening, up to the precise finish cut outline. Because many blade strokes are taken for short advances of the blade in the order of a blade thickness along the opening a very polished finish cut can be achieved.

The teeth of the saw are angled downward for cutting on the down stroke, and when the saw completes its up stroke a set screw 120 strikes one end of the lever 122 swinging the saw blade S away from the workpiece momentarily.

As the saw S repeatedly moves to engage the workpiece during its down stroke and swings at the end of its up stroke, the tracer T advances to engage the punch/template P and retracts from engagement at the end of the saw up stroke while the saw is moving along the cut surface and the tracer T is moving along the punch/template surface. The tracer T thus vibrates to and from engagement with the punch/template, this vibration allowing the tracer to skip sidewise over rough irregularities in the face of the punch/template which might otherwise resist lateral movement of the tracer T along the punch/template P. In this way the vibrating motion of the blade aids smooth tracing of the template. The extent of blade vibration can be adjusted by the set screw 120 to control the ease of tracing.

IV—TEMPLATE AND TRACER—FIGS. 2 TO 4, 8 TO 10

It has been made clear that the punch P ultimately to be used with the die W which is finish-cut with the present apparatus, this punch, is also the template which is followed by a tracer T to control the finish cutting of the die. While it is accurate to say that the tracer T follows the external outline of the punch/template P the tracer on its cursor 102 is held against transverse movement along the workpiece carriage crossbar 608 by a sprocket chain 104. The punch/template P moves transversely of the tracer T, parallel to the crossbar 608 and transversely of the direction of cutting of the saw blade S. The tracer, however, does move with the workpiece carriage 6, at right angles to the crossbar 608, or longitudinally in the direction of cutting.

The sprocket chain 104 which anchors the cursor 102 to the base 1 against transverse movement, as shown in FIG. 4, is guided from its anchor 106 on the base 1 in a closed loop over rollers on the workpiece carriage 6, 126, 127 and 128 leading to the cursor 102, and thence over rollers 129, 131 and 132 leading back to the base anchor 106. The base anchor 106 is a rod secured to the tilting arm 2 on the base, the rod passing through an oversized link 105 in the chain 104. The oversized link 105 slides on the anchor rod 106 as the workpiece carriage 6 moves transversely of the base. The other chain anchor, best shown in FIG. 9, is a hook 132 attached underneath the tracer cursor 102 with a tip 133 extending through the sprocket chain between its link pins.

The purpose of anchoring the tracer cursor 102 with the chain 104 is to allow the workpiece carriage 6, its standard 611 and crossbar 608 to support the cursor 102 slidingly so that the workpiece carriage 6 can move transversely of the base 1 without moving the cursor 102 and its tracer T transversely also. That is, the tracer is fixed relative to the base 1 against movement transversely of the saw cutting direction as is the saw or cutter, while the workpiece carriage 6 and punch/template carriage 4 are movable transversely.

As shown in FIG. 9 the tracer cursor 102 is slidingly supported on the workpiece carriage crossbar 608 by a clamp 616 on a channel 615 under the cursor body. The tracer itself is a rod with a beveled end engaging the punch/template P and a threaded shank surrounded by a thumb screw 617 longitudinal adjustment of the tracer rod. The cursor has a tongue which slides longitudinally in a socket 619 mounted on the channel 615. A micrometer 621 adjusts the longitudinal position of the cursor such that the tracer T engages the punch/template P at a point corresponding to the cutting engagement of the saw blade S with the workpiece W.

As will be explained in more detail the engagement of the tracer T with the punch/template P controls movement of the die/workpiece W in relation to the saw S.

V—CUTTING STRAIGHT DIE FACES—FIGS. 2 TO 4, 7 AND 10

There are two manual drives, which of course could be motorized. One is for driving the punch/template carriage 4, and workpiece carriage thereon, linearly transversely of the base 1 and cutting direction of the saw blade S. The second is for rotating the punch/template P on its carriage 4 and simultaneously rotating the die/workpiece W on its carriage 6. A third movement, longitudinally of the base 1 parallel to common or parallel planes through the template is effected by interaction of the tracer T and punch/template P.

Figure 6:
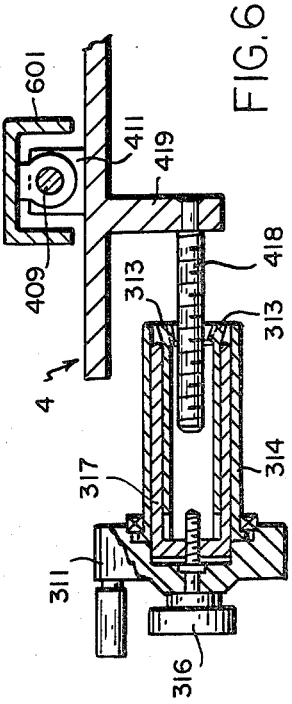
FIG. 6 is a section on line 6—6 of FIG. 5.

The first manual linear drive is effected by a first handcrank 311 rotating in a bearing block 312 (FIGS. 1, 2, 4 and 6). As shown in FIG. 6 the crank 311 has a pair of toothed jaws 313 engaging a threaded stud 418 staked in a bracket 419 depending from the workpiece table 4. A thumb screw 316 draws the jaws into a sleeve 317 engaging the jaws with the thread on the stud 418. When released from the sleeve 317 by turning the thumb screw the jaws spring open out of engagement with the thread thus freeing the template carriage 4 and allowing it to slide without restraint on the rods 307 of the base frame 3 for automatic movement described under caption

VI—CUTTING ARCUATE DIE FACES

The linear drive drive crank 311 is used for moving the die/workpiece W and punch/template P when cutting straight or plane faces of the die.

Prior to beginning a straight cut a straight edge of the workpiece W and template P must be oriented transversely of the base. For example, in FIG. 2 the punch/template P has an arcuate surface opposite the tracer T; and the blade S is opposite a rounded interior surface of the workpiece. Both the template P and workpiece W must be rotated until straight faces of each are opposite the tracer T and saw blade S respectively. For this purpose the second rotary drive is used.

The origin of the rotary drive is a hand wheel 421 on a bracket 422 arising from the template carriage 4. The bracket 422 journals a shaft 423 at whose end is a worm 424 meshing with a worm wheel 426 on the collar 412 holding the punch/templte P (FIGS. 2, 3, 4, 7 and 10). Rotation of the handwheel 421 rotates the punch template and also drives two gear chains.

The first, rotary gear train linked to the hand wheel 421 drives the workpiece holder 607 and consists of a spur gear 427 on the shaft 423 and linking gears 428, 429 and 431 (FIG. 3). The last gear 431 is on a slip coupled shaft 432 at whose end is a worm 433 meshing with worm wheel 434 driving the rotary work holder 607.

Figure 15:
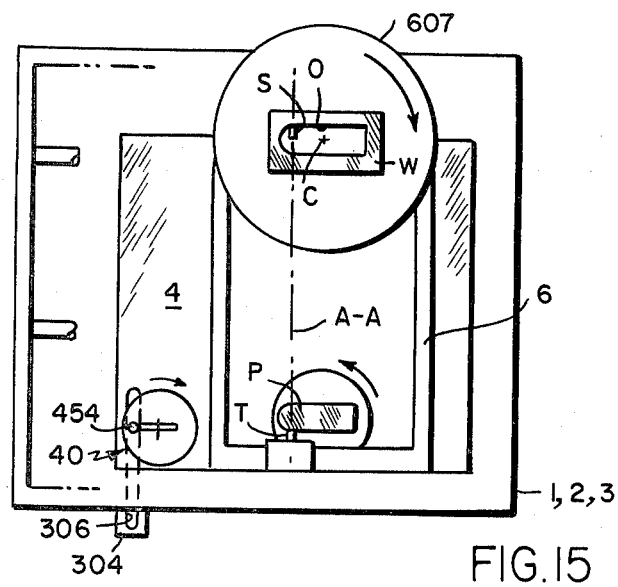

With this first rotary drive off the hand wheel 421 the collar holding the punch/template P and the die/workpiece W may be rotated counter to each other until one of the linear faces of the workpiece is rotated from the position shown in FIG. 2 to a position in which the linear face is transverse the saw-blade S and a corresponding face of the die/template is transverse the tracer T, as shown for example in FIG. 15.

The saw motor M can then be turned on and cutting of the linear face can be started by turning the linear drive hand screw 311. The tracer T will remain fixed as it traverses the straight exterior face of the punch/template and the saw S cuts along the mirror image interior surface of the die/workpiece.

It is an important aspect of the present invention that because the saw blade S engages the workpiece W in the same direction as the tracer T engages the punch/template P the reaction or kickback of the workpiece resulting from the impact of the saw blade will in turn micrometrically urge the workpiece W, its carriage 6 and the tracer T carried on the workpiece carriage crossbar 608 in a direction which urges the tracer T toward the punch/template P. This reaction is most simply shown in FIG. 15 wherein reaction of the workpiece W and its holder 607 would tend to move the workpiece carriage 6 upwardly toward the top of FIG. 15. Such upward movement would press the tracer T on the workpiece carriage 6 into closer engagement with the punch/template P. This mirror image reaction insures that the saw blade will be guided in its cut by close following of the tracer T along the punch/template P. Even if the template is not perfectly aligned at right angles to a common plane through the tracer and saw, the saw will cut precisely the outline of the punch/template. That is, the interaction of the tracer T and template P would automatically adjust the workpiece carriage 6 longitudinally of the cutting plane so that the saw in effect would follow the punch/template surface.

VI—CUTTING ARCUATE DIE FACES—FIGS. 2 TO 6, 7, 8 AND 11 TO 17

In addition to finish-cutting straight faces on a die or other workpiece it is often necessary to cut a fillet or like arcuate surface such as is shown engaged by the blade S in FIG. 2. An arcuate surface could be cut by turning the rotary drive wheel 421 previously described. But the arc turned would necessarily have a radius determined by the distance between the curved surface and the central axis C of rotation of the workholder 607, whereas the arc desired might have a much shorter radius on an axis offset from the axis C of rotation of the workholder 607. The present apparatus compensates for the offset of the workholder axis and the workpiece surface axis.

As shown in FIGS. 2 and 4 the collar 412 holding the punch/template P and turned by the rotary hand wheel 421 carries a ring gear 437 which engages another ring gear. The second ring gear is normally coupled to a bevel gear 439 by a lock screw 441 which may be loosened to decouple the two gears. The bevel gear is the first in a gear train which includes a double bevel gear 442, a single bevel gear 443 connected through a shaft 444 to a spur gear 446, all shown in FIG. 4. As shown in FIGS. 2 and 5, the gear train further includes gears 447 and 448 connecting gear 446 to a gear 449 which turns an off-axis compensating rotor 40 including the manual clamping screw 408, all gears of this train being mounted on the template carriage 4.

As shown in detail in FIGS. 11 and 12 the compensating rotor 40 comprises a stem 451 into the upper end of which is threaded the clamping screw 408. The lower end of the stem extends through the gear 449 and is welded to a cross pin 452. A rider 453 having an eccentric pin 454 extending below it into the slot 306 in the tab 304 of the base frame 3 shown in FIG. 1. Tightening the clamp screw 408 draws the stem 451 cross pin 452 and rider 453 upward clamping the rider against the gear 449 so that the stem rider turns with the gear. Normally the clamp screw is loose and the stem, cross bar and eccentric pin are locked against rotation by a spring urged pin 456 retractable by a thumb screw 457. Moreover, if the eccentric pin 454 is positioned coaxially with the rotor stem as shown in FIGS. 11 and 12 its eccentricity is zero and rotation has no affect. In cutting an arcuate surface however, the eccentric pin is offset either to the right or left of the coaxial position shown in FIG. 12.

To prepare for arcuate cutting the release 316 for the linear handcrank 311 is loosened disconnecting the template and workpiece carriages 4 and 6 from the linear drive so that they are free to move transversely of the cutting plane (3—3 in FIG. 14) subject to the control of the punch/template and the eccentric pin 454. The worktable is then rotated and moved transversely until the saw is on and at the beginning of the arc to be cut. As shown in FIG. 15, this adjustment will offset the eccentric screw 454 from the center of the rotor 40 by the same amount as the center of the arc to be cut is offset from the center C of rotation of the worktable 607. Then the clamp screw 408 is tightened to hold the pin in eccentric position, and further the lock screw 441 is tightened to couple the gear train between the template collar 412 and the rotor gear 449.

Figure 16:
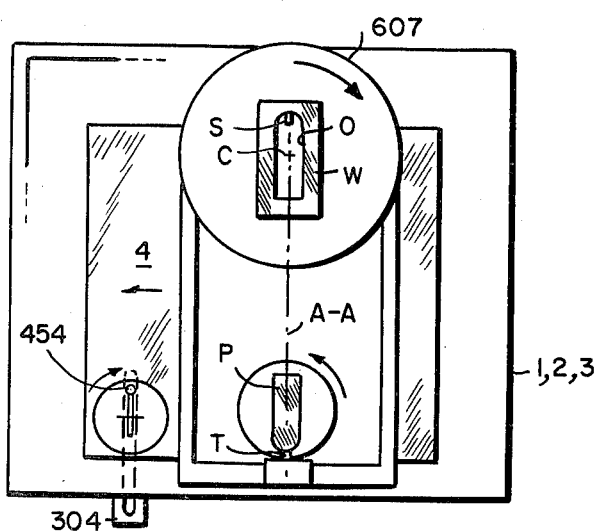
Figure 17:
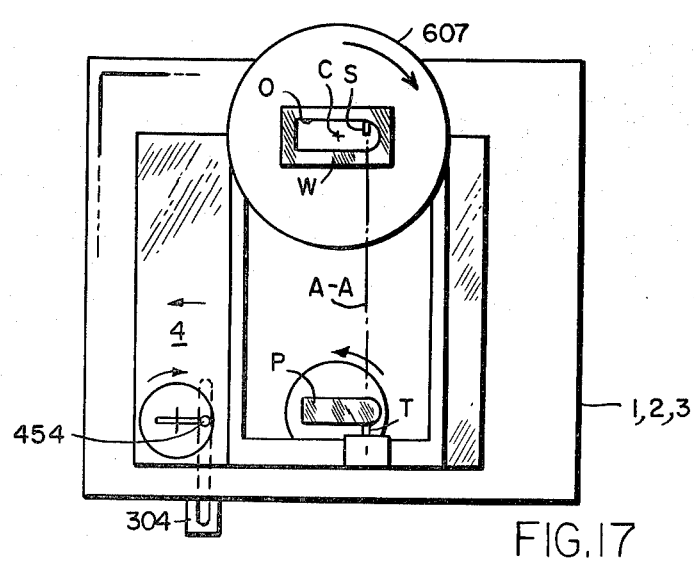

The arcuate surface is then finish-cut by actuating the saw and turning the rotary drive hand wheel so that the template and workpiece are rotated mirror image-wise through the position shown in FIG. 16 to the end of the arcuate cut shown in FIG. 17. Note that as the cut progresses rotation of the eccentric pin in the slot 306 of the tab fixed, motionless on the base frame 3 causes the template and workpiece carriages 4 and 6 to move leftward enough to compensate for the initial offset, or difference between the radius of the workpiece rotation and of the arcuate surface. Thus in FIGS. 16 and 17 the two carriages 4 and 6 have moved transversely to the left of their positions in FIG. 15. Longitudinal movement also seen in FIGS. 15 to 17 is controlled by the engagement of the template P by the tracer T. The result is that, as shown, a circular arc of 180° is smoothly finish-cut with both ends tangent to the adjacent straight portions.

To revert to straight cutting (FIG. 14) the rotor clamp screw releases the eccentric pin, the rotor gear train is uncoupled by loosening the screw 441 and the screw 316 is tightened to re-engage the linear drive crank 311.

It should be understood that the present disclosure is for the purpose of illustration only and that this invention includes all modifications and equivalents which fall within the scope of the appended claims.

What is claimed is:

1. Apparatus for cutting a predetermined outline on a workpiece comprising:
    a base,
    a workpiece carriage and template carriage movably mounted one upon the other and the other movably mounted upon the base,
    a cutter on the base for engaging and applying cutting force in a direction toward the workpiece and workpiece carriage,
    a workpiece holder on the workpiece carriage holding the workpiece for movement with the workpiece carriage relative to the cutter,
    a template on the template carriage having the predetermined outline, and
    a tracer on the workpiece carriage engaging the template and causing the workpiece carriage to follow the template outline,
    the cutter and tracer being disposed on the base and workpiece carriage respectively so as to engage the workpiece and template respectively in the same direction so that reaction of the workpiece and workpiece carriage to cutting force urges the template and tracer toward mutual engagement.

2. Apparatus according to claim 1 including means mechanically linking the workpiece and template carriages for simultaneous movement of the workpiece and template in mirror image relation.

3. Apparatus according to claim 1 including means holding the tracer in engagement with an exterior template outline and means holding the cutter in engagement with an interior workpiece outline.

4. Apparatus according to claim 1 wherein the tracer and cutter are at fixed positions transversely of the cutting direction and the template and workpiece carriages move the template and workpiece relative to the fixed positions.

5. Apparatus according to claim 1 including means slidingly supporting one carriage on the other carriage for movement in a first direction.

6. Apparatus according to claim 5 including means slidingly supporting the other carriage on the base for movement in a second direction.

7. Apparatus according to claim 6 wherein one of the first and second directions is in the direction of cutting and the other of the first and second directions is at right angles to the direction of cutting.

8. Apparatus according to claims 1, 3 or 6 wherein the tracer and cutter lie in common or parallel planes and including means guiding the carriages respectively move in directions parallel and normal to said planes.

9. Apparatus according to claim 1 including means for driving one carriage in a first direction.

10. Apparatus according to claim 9 including means linking the carriages such that interaction of the template and tracer to driving one carriage in the first direction urges the template and both carriages in a second direction.

11. Apparatus according to claim 1 including:
a template holder rotatably mounted on the template carriage,
the workpiece holder securing the workpiece for rotation about a first axis,
a rotary drive coupling the template holder and workpiece holder for coordinated rotation of the template and workpiece while cutting an arcuate outline around a second axis,
and
an eccentric coupled to said drive for moving the workpiece carriage to hold the second axis in line with the cutter.

12. Apparatus according to claim 11 wherein the eccentric rotates on one of the carriages.

13. Apparatus according to claim 12 wherein the eccentric engages the base.

14. Apparatus according to claim 11 including means for adjusting the eccentric so that the eccentricity compensates for the spacing of the second axis from the workpiece axis.

15. Apparatus according to claim 1 including means to vibrate the cutter to and from the workpiece.

16. Apparatus according to claim 11 wherein the eccentric comprises a rotor on the template carriage coupled to the rotary drive, a diametric guide on the rotor, an eccentric member sliding on the guide between a position on the axis of the rotor and adjusted positions eccentric thereof, means for holding the pin in adjusted position, and a slot on the base receiving the pin, whereby rotary motion of the workpiece rotary drive moves the template carriage in a direction to compensate for the aforesaid axis spacing.

17. Apparatus according to claim 1 wherein the template and workpiece carriages hold the template and workpiece at different levels, the template carriage including a template holder pivotted on the template carriage so that the template may be swung from the tracer to the level of the workpiece for axial alignment therewith.

18. Apparatus according to claim 17 wherein the template holder pivots 180 degrees in swinging from the tracer to the workpiece so as to reverse its outline.

19. Apparatus according to claims 1 or 17 wherein the workpiece comprises an unfinished metal forming die having an aperture within an interior outline and the template comprises a punch with the same exterior outline.

20. Apparatus according to claim 1 including means on the workpiece carriage to mount the tracer fixed in a direction transverse of the cutting direction and movable in the direction of cutting.

21. Apparatus according to claim 20 wherein the tracer mount includes a track on the workpiece carriage slidingly engaging the tracer, the workpiece carriage being movable longitudinally of the cutting direction.

22. Apparatus according to claim 21 including means linking the tracer to the base to hold the tracer fixed in the direction transverse of the cutting direction.

23. Apparatus according to claim 22 wherein the linking means comprises an endless belt-like linkage, means on the workpiece carriage guiding the linkage on a path between a connection to the tracer and an anchor on the base.

24. Apparatus according to claim 23 wherein said anchor comprises a sliding connection between the linkage and the base allowing movement of the linkage with the workpiece carriage.

25. Apparatus according to claim 15 including means to adjust the extent of cutter vibration.

26. Apparatus according to claim 15 wherein the carriages constitute a linkage between the saw and tracer causing the tracer to vibrate to and from the template thereby to facilitate tracing along the template.

27. Apparatus according to claim 15 or 26 wherein the cutter constitutes a reciprocating saw and the means to vibrate comprises means to move the saw to and from the workpiece on the saw strokes.

* * * * *